Feb. 8, 1949.　　T. F. MILLHEAM　　2,461,431
CHAMFERING TOOL
Filed Oct. 8, 1945
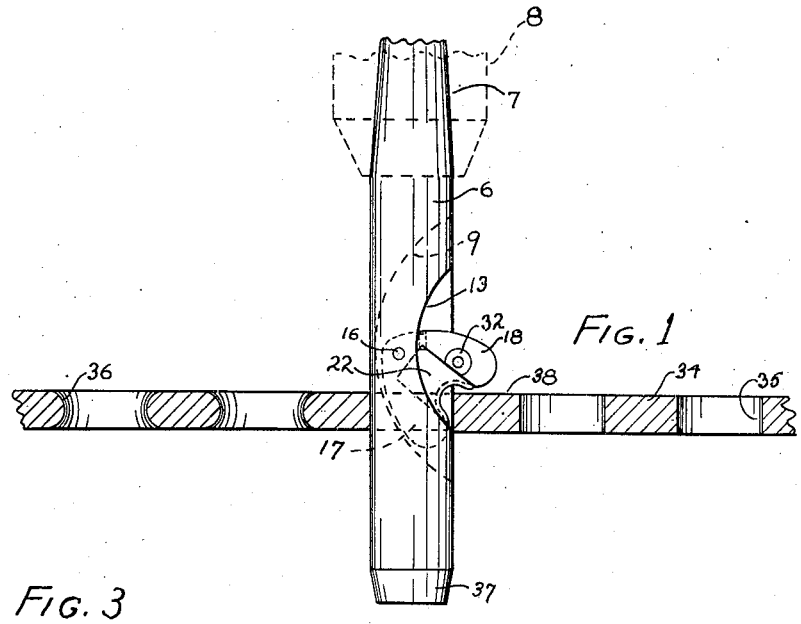
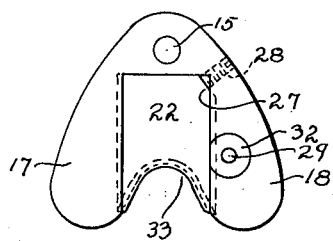
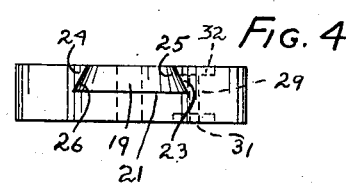
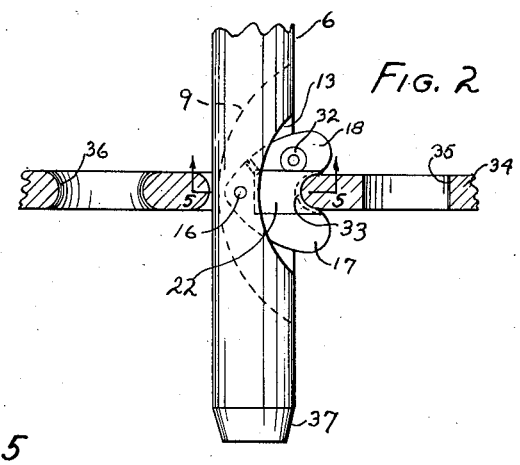
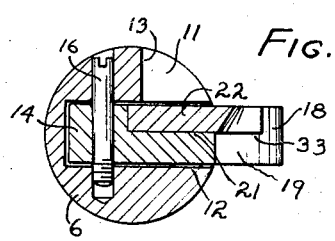
INVENTOR.
Theodore F. Millheam
BY
Melanna and Morsbach Patented Feb. 8, 1949

2,461,431

UNITED STATES PATENT OFFICE 2,461,431

CHAMFERING TOOL

Theodore F. Millheam, Beloit, Wis.

Application October 8, 1945, Serial No. 620,954

4 Claims. (Cl. 77—73.5)

This invention relates to tools and has special reference to a tool for chamfering the edges of a cylinder hole to produce a chamfered periphery.

The primary object of the invention is the provision of a tool adapted for insertion through an opening and rotatable to chamfer the walls of the opening at opposite ends thereof.

A further object is the provision of a tool of the character described wherein the cutting element is operated in response to movement of the tool into and out of the opening in the work piece.

Other objects and advantages will appear from the following description and the accompanying drawing, in which:

Figure 1 is a side view of one embodiment of the invention showing the position of the parts as the cutter enters the work;

Fig. 2 is a fragmentary view similar to Figure 1 showing the position of the parts as the chamfering step is completed;

Fig. 3 is a face elevational view of the cutter;

Fig. 4 is an edge view of the cutter, and

Fig. 5 is a sectional view on the line 5—5 of Fig. 2.

The embodiment of the invention shown in the drawings is intended primarily for removing a small amount of stock from a work piece at the junction between the sides of the work piece and the walls of the hole to produce shaped corners and remove any burrs which may have been produced at the corners by drilling or other manufacturing operations. Other specific purposes may be served by slight changes in the contour of the cutter, as will be plain to those skilled in the art.

The tool includes a cylindrical body portion 6 having an end 7 shaped for reception in a driving mechanism diagrammatically indicated at 8, any conventional driving arrangement being satisfactory, the tool commonly being made in different forms to fit different tools adapted to rotate the body. The body is shaped for snug guiding reception into the hole of a work piece and intermediate the ends of the body is a slot 9 extending longitudinally thereof and providing spaced side walls 11 and 12 between which is disposed a cutter comprising a blade 22 and a blade holder 14. The wall 11 is cut away as indicated at 13 so as to partially expose the cutter, as will be apparent from Figure 1.

The blade holder, designated generally by the numeral 14, is of heart-shaped configuration having a thickness for snug reception in the slot 9 and provided with an opening 15 adjacent the point of the heart for reception of a pivot pin 16 extending transversely of the body and across the slot, as will be apparent from Fig. 5. The holder is thus free to rotate about the pin 16 as an axis. The cutter has a pair of legs 17 and 18 hereinafter called the first and second portions, these portions being separated by a space 19 spaced for a distance sufficient to receive the work piece therebetween in the manner shown in Fig. 2. The holder is provided with a slot 21 for the reception of a blade 22, the side walls of the slot diverging from the surface of the holder toward the bottom of the slot as indicated at 23 and 24, and the sides of the blade have complemental side walls as indicated at 25 and 26. It will thus be seen that the blade is adapted for insertion into the holder by sliding the same endwise in between the tapered walls 23 and 24. One corner of the blade is flat as indicated at 27 and the holder is provided with a set screw 28 cooperable therewith to define the operating position of the blade and to adjust the position thereof. The blade is held in fixed position on the holder by a screw 29 extending through the holder and having a head 31 countersunk in one face thereof and a nut 32 countersunk in the opposite face thereof, the screw being located in such position that the nut 32 when drawn tight pinches against the side wall 25 of the blade to retain it against movement outwardly of the slot. The nut 32 has a flattened tapered side wall complemental to the taper on the side of the blade, as shown, to give a maximum bearing surface. The blade has an arcuate cutting edge spanning the space between the portions 17 and 18, the cutting edge in this instance being arcuate as indicated at 33 to produce the desired arcuate cut in the work piece. This cutting edge may be varied as desired to cut the desired configuration.

In Figs. 1 and 2 the numeral 34 designates a work piece, for example of metal, having a plurality of holes 35 therein produced as by drilling and on which it is desired to produce chamfered corners as indicated at 36. While the work piece shown is of flat stock, it will be seen that because of the pivotal mounting of the cutter and other features of the structure the work piece may be tubular, for example, with the holes extending laterally thereof or may have other slopes. In this instance the body 6, which is of slightly smaller diameter than the holes and the lower end of which is slightly tapered as shown at 37, is inserted into the holes and passed downward to and beyond the position shown in Figure 1. It will be seen that the first portion or leg 17 of the holder and cutter is of such shape and dimension as to rest wholly within the slot 9 and the peripheral confines of the body 6 so that as the tool is moved down, this portion of the cutter moves through the hole 35 until the outwardly extending portion of the cutting edge adjacent the portion 18 comes into contact with the upper face 38 of the work piece. As inward movement of the tool is continued, it will be seen that the cutter is rotated, bringing the portion 17 outward and the outwardly extending portion of the cutting edge adjacent the portion 17 into cutting relation with the work piece at the lower end of the hole, at which point the cutter simultaneously begins the cutting operation at the upper and lower ends of the hole. Progressive rotation of the cutter occurs as the tool is moved downward to the final position shown in Fig. 2, in which position the cutting or chamfering operation is completed. At this point the body and tool are again moved upward with respect to the work piece 34 and the cutter reverses its rotary motion to bring the cutter back to the position of Figure 1 as the tool is removed from the work, so that the cutter is in proper position for insertion of the tool in the next opening.

It will be seen that the tool is so arranged as to simultaneously chamfer the work piece at both ends of the hole and the tool engages the work in such fashion that no marks are produced on the surface of the work. It will also be observed that the tool is used very much in the fashion of a conventional drill and the cutter is so constructed that the tool may move down beyond the point at which the chamfering operation is completed without damaging the work, since the second portion of the holder can move back into the slot. The structure is also such that the cutter is automatically repositioned in response to removal of the tool from the work.

I claim:

1. The combination in a chamfering tool of a rigid unitary body shaped for snug reception and rotation in a hole of a work piece having a free end and an end shaped for reception in a rotary and longitudinal movable driving means, said body having a slot extending longitudinally thereof intermediate its ends, a single cutter mounted in said slot having a first portion shaped to rest wholly within the slot for entry of said portion with the body into the hole to an initial position and a second portion projecting from said slot in said initial position to engage a face of the work piece as the tool is moved farther into the hole from said first position, means for pivotally supporting the cutter for rotation on the body on an axis transverse to the body as the body is moved farther through the hole with said second portion engaging the side of the work piece to bring the first portion out of the slot to a position in which said portions straddle the edge of the hole, said cutter including a blade shaped to progressively cut the material of the work piece as the cutter rotates about said transverse axis.

2. The combination in a chamfering tool of a rigid solid body shaped for snug reception and rotation in a hole of a work piece, having a free end and an end shaped for reception in a rotary and longitudinally movable driving means, said body having a longitudinal slot intermediate its ends, a single cutter mounted in said slot having spaced legs interconnected and providing an intermediate recess for the reception of the work piece adjacent the hole, the cutter including a cutting edge defining at least a portion of the outline of the recess shaped to chamfer the work piece adjacent the hole upon rotation of the cutter into spanning relation with the work, the one of said legs disposed nearest said free end being shaped for complete reception within the confines of the body when the cutter occupies an initial position, and the other leg being shaped to project from the body for contact with the work piece in said position, means for pivotally supporting the cutter for rotation in said slot on an axis transverse to the body upon movement of the body longitudinally through the hole with said other leg engaging the work piece between said initial position and a final position with both of said legs projecting from said slot in the same radial direction spanning the thickness of the work piece to produce a chamfering cut at the periphery of the hole.

3. The combination recited in claim 2 wherein said cutting edge has a shape approximating a U for engagement with the work piece adjacent opposite sides thereof to chamfer both edges of the work piece in a single movement of the cutter between said initial and final positions.

4. The combination recited in claim 2 wherein said cutter comprises a blade holder and a blade attached thereto having said cutting edge, means for securing said blade on the blade holder, and adjustable abutment means engaging the blade for holding it in adjusted positions on the holder.

THEODORE F. MILLHEAM.

REFERENCES CITED

The following references are of record in the file of this patent:

UNITED STATES PATENTS

| Number | Name | Date |
|--------|------|------|
| 348,412 | Perrigo | Aug. 31, 1886 |
| 752,724 | Taylor | Feb. 23, 1904 |
| 1,530,593 | Calkins | Mar. 24, 1925 |
| 1,568,056 | Butz | Jan. 5, 1926 |
| 2,373,474 | Heyer | Apr. 10, 1945 |

FOREIGN PATENTS

| Number | Country | Date |
|--------|---------|------|
| 650,246 | Germany | Feb. 16, 1936 |

OTHER REFERENCES

American Machinist, Nov. 1, 1917; page 780.